2 Sheets--Sheet 1.

C. MURDOCK.
Stave-Jointing Machines.

No. 143,991. Patented Oct. 28, 1873.

Attest:
J. Mason Goszler
Huy Orth

Inventor:
Charles Murdock
By N. Cramford, atty.

AM. PHOTO-LITHOGRAPHIC Co.N.Y.(OSBORNE'S PROCESS)

C. MURDOCK.
Stave-Jointing Machines.

No. 143,991.  Patented Oct. 28, 1873.

2 Sheets--Sheet 2.

Attest:
J. Mason Goszler
Henry Orth

Inventor:
Charles Murdock
By N. Crawford
atty.

UNITED STATES PATENT OFFICE.

CHARLES MURDOCK, OF SARNIA, CANADA.

IMPROVEMENT IN STAVE-JOINTING MACHINES.

Specification forming part of Letters Patent No. 143,991, dated October 28, 1873; application filed January 24, 1873.

*To all whom it may concern:*

Be it known that I, CHARLES MURDOCK, of Sarnia, Ontario, in the Dominion of Canada, have made certain Improvements in Stave-Jointing Machines for Barrels, Casks, or Tubs, of which the following is the specification:

The object of this invention is to produce a machine in which a stave is clamped and held in the shape it is to be when in the barrel or cask, and saw the joint on the edges of a stave in a radial direction, regardless of its width, and having the exact shape in every respect necessary for setting up in the cask or barrel ready for trussing; and it consists in the construction and arrangement of the parts necessary to produce the result, as will be hereinafter more fully described.

Figure 1:
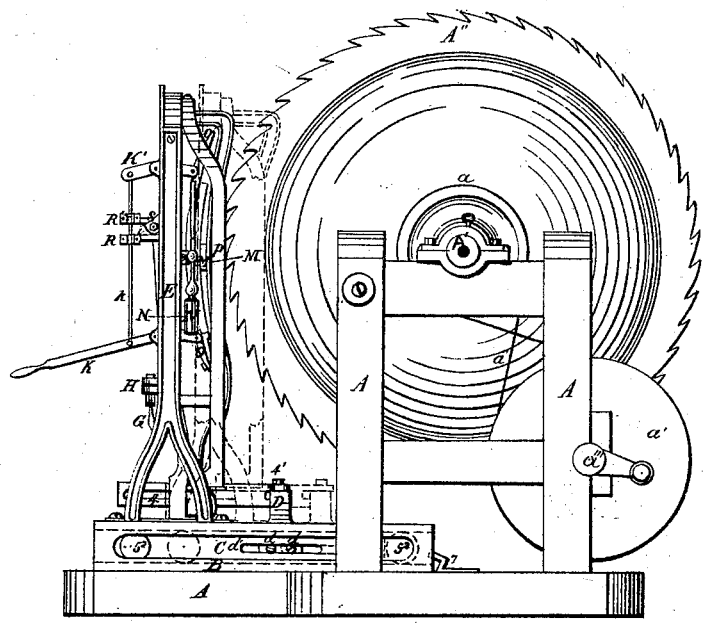
Figure 2:
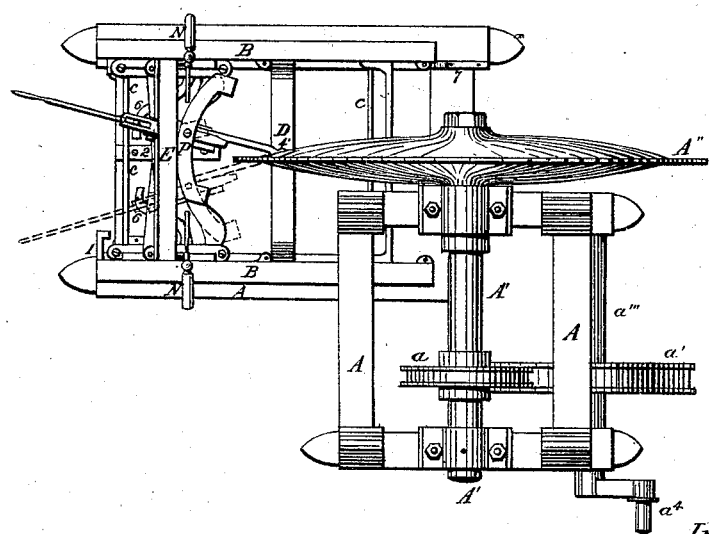
Figure 3:
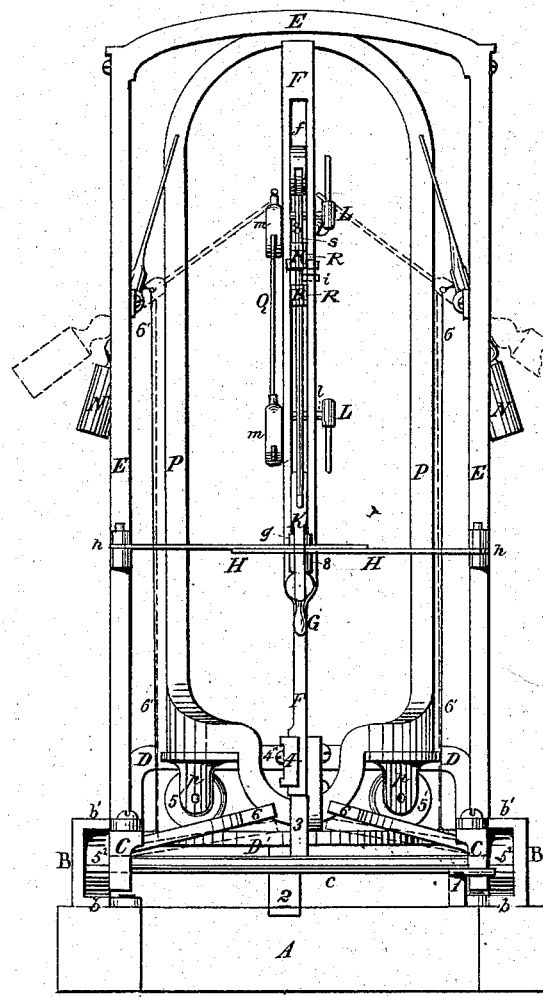
Figure 4:
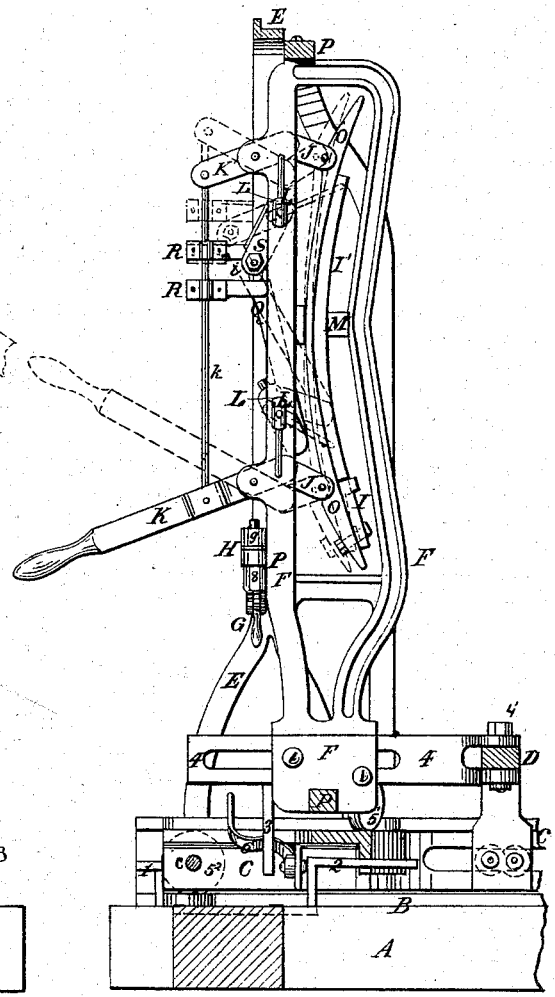

In the drawings, Figure 1 represents a side view of the machine; Fig. 2, a top view; Fig. 3, a view of the rear side enlarged; Fig. 4, an enlarged side view of the clamping-carriage; and Fig. 5, detail of some of the parts.

Figure 5:

A represents the frame that supports the saw, the clamping devices, and carriage. A' is the saw arbor or shaft, working in proper journal-boxes on frame A. A'' is the circular saw, having the diameter to give the same circle on the teeth that the stave will have from end to end when in the barrel or cask. $a$ is a band-pulley fast on shaft A', and $a'$ is a band-pulley on driving-shaft $a'''$; and when power is applied to and revolves shaft $a'''$ by the crank $a^4$, or other convenient means, the saw will be revolved through the medium of the pulleys $a'$, band $a''$, and pulley $a$ on shaft A'. The saw and saw-shaft move only in revolution. Upon a portion of the frame A is supported the clamping device and stave-carriage, and in which B B are the tracks or guideways, formed by the inwardly-projecting bottom flanges $b\ b$, on which the truck-wheels of the reciprocating carriage rotate and travel, and the upper inwardly-projecting flanges $b'\ b'$ act as keepers to prevent the carriage and clamping devices from rising, as the space between the flanges $b$ and $b'$ is just enough to allow the truck-wheels to freely rotate and not bind. C C are the side sills that support the reciprocating carriage and clamping device, and through which go the transverse axles $c$, on which are truck-wheels $5^2\ 5^2$. D is an adjustable arched cross-beam, attached to and adjustable upon the side sills C by the screws $d$ $d$ in slots $d'$ of the sill C, as seen in Fig. 1. D' is a circular transverse track-plate, attached at each end to the side sills C, and forms a way for the trucks to the clamping-frame to travel upon. E is an upright frame firmly secured upon the top of the sills C, and travels with them in their reciprocations, and supports other devices. F is the upright clamping-frame that sustains the stave-clamping devices, and in its rear upright part has the slot $f$, in which some of the actuating parts of the clamping device operate. P is an upright frame that supports the clamping-frame and clamping devices, and is constructed in the form as seen in Fig. 3, and rests upon truck-wheels $5^1\ 5^1$, that freely revolve on axles in bearing $p\ p$, and travel upon the circular transverse track-plate D'. 4 is a slotted arm pivoted at 4' to the adjustable arched cross-beam, and is adjusted upon the upright frame F by screw 4''. This pivotal point 4' is always the center of the diameter of the cask for which the staves are being jointed, and by adjusting the frame F upon the pivoted arm 4 will give the required size or diameter of the barrel or cask. The front upright part of the frame F is curved, and has a clamp or bearing block, M, fast on its rear side and on a horizontal line with the center of the saw-shaft A', to determine the bilge of the stave to be clamped. O is a curved steel spring clamp-bar for forcing the stave to be jointed against the bilge-block M, and has an adjustable stop, I, on its forward side to hold the bottom end of the stave. This stop can be adjusted on the clamp-bar to accommodate different lengths of staves I', as seen in Fig. 4. J J are links pivoted at one end to the rear side of the clamp-bar O, near its upper and lower ends, and at the other to lever-handle K or bar K', that are pivoted to rear slotted upright of frame F. $k$ is a connecting-rod, pivoted at its upper end to bar or arm K', and at its lower end to lever-handle K, so that both ends of the clamp-bar O will be operated at the same time and the same distance, when the lever-handle K is forced down, as seen in Fig. 1. R R are tappet-arms clamped and adjusted upon the connecting-rod K, and at such distance apart as to be on either side of the pin $i$ on arm S, that is fast upon a rock-shaft that goes transversely through the rear upright part of frame F. $l\ l$ are rock-shafts working in bearings in the rear upright of frame F, and to the upper one of which the arm S is attached and works within the slot $f$ of rear upright F. To the ends of the rock-shafts $l\ l$, and on the outside of the upright, are attached links or arms $m\ m$, one of which extends in one direction from the rock-shaft to which it is attached, while the other link or arm extends from the other rock-shaft in the opposite direction. Q is a connecting-rod that connects the two outer ends of the links or arms $m$ together by pivotal joints, so that the tappet-arms R on connecting-rod $k$, on being reciprocated, will cause the vibration of the rock-shafts through the pin $i$ and arm S. Upon the opposite ends of the rock-shafts $l\ l$ are vibrating gages L L, that, as the stave I' is placed in the position to be clamped, the gages L L will be turned, so that the edge of the stave to be jointed will bear against them when they are in a horizontal, or nearly horizontal, position; but, as the handle K is brought down and acts upon the arms and toggle-joints to clamp the stave, the rock-shafts $l\ l$ will vibrate and be in, or nearly in, a perpendicular position, and out of the way of the saw, thus furnishing a gage to stop the edge of a stave against in clamping it, and when clamped the gage is, by the action of clamping, moved out of the way. 6 6 are treadles, hinged to the sides C, to which the swing or vibrating stops N N are connected by the rods 6' 6'. The purpose of these stops being to regulate the vibration of the upright receiving or clamping frame F, and by putting the foot upon one treadle and turning the stop to be horizontal, the frame F is then swung around till the edge of the stave in the clamp strikes the inner end of the stop, when the stave and frames F and P are ready to be advanced forward toward the saw. To secure the clamping frame or receiver F in this position, slotted horizontal bars H H are hinged at $h\ h$ to upright of frame E, as seen in Figs. 3 and 5, and passing each other, while a screw-bolt, $g$, Fig. 5, with a nut on its top, goes through a lug projecting rearward from the clamping-frame F, and through the slots in the two arms H, and has a weighted or handled cam, G, pivoted at its lower end to the screw-bolt $g$, so that when the clamping-frame F is in the position above described, by turning the cam the eccentric part will bear against the projecting lug 8 on the upright of the clamping-frame and clamp the two arms H firmly together, and so that the frame F cannot move laterally, when the frames E, F, and P will, with the clamped stave, be forced forward to the saw, which, being in rapid revolution, quickly saws the edge of the stave to a smooth joint. 1 is a bumper or stop to prevent the carriage in its backward movement from going too far, as it is unnecessary to move the carriage with the clamping-frame but little more than the thickness of the stave. 2 is a stop in the center of that part of the frame upon which the clamping-frame and carriage rest, and its office is to prevent any forward movement of the carriage and clamping-frame, except when the frame is in the proper position to move forward without the saw touching the frame itself, as on the bottom of the rear upright part of the clamping-frame is a downwardly-projecting guard-piece, 3, that will bear against the stop 2, and prevent the frame from reaching the saw; but when the clamping-frame is turned so that the guard-piece 3 will pass the stop 2, then the carriage can safely move forward, and the frame F cannot touch the saw. At the forward reciprocation of the carriage on the foundation-frame A is another stop or bumper, 7, Figs. 1 and 2, which prevents the reciprocation of the carriage too far in that direction, and can be adjusted to accommodate the throw of the carriage when staves for different diameters of casks, or different thickness of staves, are to be jointed.

A machine constructed as above described will, with unerring certainty, securely clamp and perfectly joint the staves upon their edges so as to come together and make a tight joint in the cask without the great strain upon the truss-hoops, as usually is the case, to force the edges of the staves together to make good joints. It will also truly joint staves of different thicknesses, and for barrels or casks of different diameters, for the point, 4', at which the slotted arm 4 is pivoted to the arch-beam D always represents the center of the cask of whatever diameter, is in the same plane with the cutting-edge of the saw, and, by adjusting the clamping-frame upon the pivoted and slotted bar, the stave that is clamped in the frame is farther from or nearer to this point, as the frame may be adjusted, and when so adjusted the saw will always cut and joint the edge of the stave upon a true radial joint.

Having thus described my invention, what I claim, and desire to secure by Letters Patent, is—

1. The adjustable cross-beam D, in combination with the slotted bar 4 and clamping-frame F, constructed and arranged to operate in the manner substantially as and for the purpose described.

2. The combination, in a stave-jointing machine, of the guideways or tracks B B with the traveling carriage C and trucks $5^2$, with the upright frames E, F, and P, in the manner and for the purposes substantially as described.

3. The vibrating clamping-frame F, upright frame P, having trucks $5^1$, and adjustable slotted bar 4, in combination with the curved transverse track-plate D' on the reciprocating carriage, in the manner and for the purpose substantially as described.

4. The vibrating clamping-frame F, having the pendant 3, in combination with the stop 2, constructed and arranged in the manner and for the purposes substantially as described.

5. The treadles 6 and connecting-rods 6', in combination with the overbalanced pivoted swing-stops N, in the manner and for the purpose substantially as described.

6. The cam G and bolt $g$, in combination with the slotted pivoted bars H and lug 8 on frame F, in the manner and for the purpose substantially as described.

7. The curved spring clamp-bar O, having the adjustable stop I thereon, in combination with the bilge-block M and clamping device, substantially as described.

8. The combination of the hand-lever K, pivoted to frame F, and lower link J, the connecting-rod $k$, arm K', and upper link J, with the clamp-bar O, when the links J are pivoted to the bar O and form toggle-joints with the lever K and arm K', substantially as described.

9. The automatic vibrating gages L L, when operated by the act of clamping or releasing the stave by means of the hand-lever K, connecting-rod $k$, and tappet-arms R R, and intermediate actuating parts, substantially as described.

10. The presenting the inside of a curved stave on an angle to the edge of the jointing-saw A'' by means of the vibrating clamping-frame F and reciprocating carriage C, substantially as described.

11. A stave-machine, such as herein described, and composed of the saw A'', in combination with the reciprocating carriage C, carrying the upright frames E, F, and P, with the clamping, holding, gaging, and stopping devices, constructed and arranged to operate as shown.

CHARLES MURDOCK.

Witnesses:
  THO. SYMINGTON,
  WM. McCALL.